(12) United States Patent
Koyanagi et al.

(10) Patent No.: US 10,323,779 B2
(45) Date of Patent: Jun. 18, 2019

(54) PIPE COUPLING STRUCTURE

(71) Applicant: TOKi Engineering Co., Ltd., Fukuoka (JP)

(72) Inventors: Satoru Koyanagi, Fukuoka (JP); Yumiko Otsu, Fukuoka (JP)

(73) Assignee: TOKI ENGINEERING CO., LTD., Fukuoka (JP)

( * ) Notice: Subject to any disclaimer, the term of this patent is extended or adjusted under 35 U.S.C. 154(b) by 335 days.

(21) Appl. No.: 15/157,725

(22) Filed: May 18, 2016

(65) Prior Publication Data

US 2016/0312935 A1  Oct. 27, 2016

Related U.S. Application Data

(63) Continuation of application No. PCT/JP2014/069256, filed on Jul. 18, 2014.

(30) Foreign Application Priority Data

Nov. 20, 2013 (JP) .................................. 2013-239566

(51) Int. Cl.
*F16L 23/20* (2006.01)
*F16L 23/18* (2006.01)
(Continued)

(52) U.S. Cl.
CPC ............. *F16L 23/20* (2013.01); *F16L 23/032* (2013.01); *F16L 23/162* (2013.01); *F16L 23/18* (2013.01)

(58) Field of Classification Search
CPC . F16L 17/06; F16L 17/08; F16L 23/12; F16L 23/16; F16L 23/20; F16L 23/02
(Continued)

(56) References Cited

U.S. PATENT DOCUMENTS 1,821,863 A    9/1931 Wilson
2,207,518 A *  7/1940 Moser ..................... F16L 17/06
                                                    285/109
(Continued)

FOREIGN PATENT DOCUMENTS

CA    2022405      2/1991
GB    2 235 741    3/1991
(Continued)

OTHER PUBLICATIONS

Notice of Reasons for Rejection dated Jun. 26, 2018 in Japanese Application No. 2015-549006, with abridged English translation.
(Continued)

*Primary Examiner* — Aaron M Dunwoody
(74) *Attorney, Agent, or Firm* — Wenderoth, Lind & Ponack, L.L.P.

(57) ABSTRACT

A pipe coupling structure, configured to prevent formation of a gap between the inner peripheral surfaces of pipe elements connected together through which gap a fluid being transported may enter, includes first and second pipe elements to be connected together. The first pipe element has a first sealing portion with an acute angle defined by a first inner peripheral surface defining a hole of the first pipe element and a first annular surface extending radially outward from an end edge of the first inner peripheral surface. The second pipe element has a second sealing portion defined by a second inner peripheral surface defining a hole of the second pipe element and a second annular surface extending radially outward from an end edge of the second inner peripheral surface. The first and second pipe elements are connected together, with the first and second end edges abutted against each other.

3 Claims, 7 Drawing Sheets

(51) Int. Cl.
*F16L 23/032* (2006.01)
*F16L 23/16* (2006.01)

(58) Field of Classification Search
USPC .................. 285/328, 336, 337, 368, 917
See application file for complete search history.

(56) References Cited

U.S. PATENT DOCUMENTS

| | | | | | |
|---|---|---|---|---|---|
| 2,303,114 | A | * | 11/1942 | Egger | F16L 17/08 |
| | | | | | 277/614 |
| 2,413,308 | A | * | 12/1946 | Arnold | F16L 17/08 |
| | | | | | 277/614 |
| 2,980,284 | A | * | 4/1961 | Gill | D01D 4/08 |
| | | | | | 220/240 |
| 3,217,922 | A | * | 11/1965 | Glasgow | F16J 15/0887 |
| | | | | | 220/378 |
| 3,455,583 | A | * | 7/1969 | Ray | F16L 23/0286 |
| | | | | | 285/106 |
| 3,618,989 | A | * | 11/1971 | Ito | F16L 23/20 |
| | | | | | 277/614 |
| 3,749,426 | A | * | 7/1973 | Tillman, III | F16L 23/20 |
| | | | | | 277/607 |
| 4,909,548 | A | * | 3/1990 | Welkey | F16L 23/18 |
| | | | | | 285/334.2 |
| 4,930,791 | A | * | 6/1990 | Ungchusri | F16J 15/3256 |
| | | | | | 277/607 |
| 5,630,592 | A | * | 5/1997 | Obara | F16J 15/0881 |
| | | | | | 277/614 |
| 6,070,912 | A | | 6/2000 | Latham | |
| 6,227,575 | B1 | * | 5/2001 | Monning | F01D 25/243 |
| | | | | | 285/187 |
| 7,159,906 | B1 | * | 1/2007 | Vaudreuil | F16L 17/06 |
| | | | | | 285/364 |
| 2010/0194103 | A1 | * | 8/2010 | McLaughlin | F16L 15/08 |
| | | | | | 285/328 |
| 2015/0159791 | A1 | * | 6/2015 | Haltiner, Jr. | F16L 23/16 |
| | | | | | 285/332.3 |
| 2015/0377393 | A1 | * | 12/2015 | Schmidt | F16L 17/06 |
| | | | | | 285/370 |

FOREIGN PATENT DOCUMENTS

| | | |
|---|---|---|
| JP | 64-11878 | 2/1989 |
| JP | 3-34542 | 7/1991 |
| JP | 4-145287 | 5/1992 |
| JP | 7-91578 | 4/1995 |
| JP | 11-325354 | 11/1999 |
| JP | 2006-83972 | 3/2006 |
| JP | 2006-161830 | 6/2006 |
| WO | 2004/109174 | 12/2004 |

OTHER PUBLICATIONS

International Search Report dated Oct. 21, 2014 in International (PCT) Application No. PCT/JP2014/069256.

* cited by examiner

PIPE COUPLING STRUCTURE

This application is a continuation of PCT/JP2014/069256 filed on Jun. 18, 2014, which claims priority to Japanese Application No. 2013-239566 filed on Nov. 20, 2013. The entire contents of these applications are incorporated herein by reference.

BACKGROUND OF THE INVENTION

1. Field of the Invention

The present invention relates to a pipe coupling structure enabling pipe elements to be connected together without a gap between inner peripheral surfaces defining holes of the pipe elements.

2. Description of the Related Art

Flange coupling is typically used to connect pipes together in various piping systems. That is, flanges are provided on end portions of pipes to be connected together, and the flanges are abutted against each other and connected together by using nuts and bolts, or the flanges are connected together with a clamp tightened around the flanges.

In such flange coupling, a rubber seal ring is generally interposed between the flanges to seal therebetween in order to prevent leakage of gas or liquid from the inside of the piping system and to prevent contamination from the outside. The rubber seal ring, however, has various disadvantages. For example, sealing may become insufficient due to aging degradation of the rubber seal ring, or rubber as a packing material may get mixed in a fluid passed through the piping system. In case of a fire or the like, the rubber seal ring may be damaged by heat, resulting in incomplete sealing.

To solve the above-described problems, there has been proposed a technique to seal a joint part of a piping system without using a rubber seal ring (Patent Literature 1). With this technique, one of pipes to be joined together is provided at an end portion thereof with a tapered surface, and an end portion of the other of the pipes is pressed against the tapered surface. Alternatively, an annular metal packing is sandwiched between flanges on mutually opposing pipe end portions, and the mutually opposing flanges are pressed against tapered surfaces provided on both sides of the metal packing, thereby performing sealing by line contact between the metal members.

The above-described technique can realize excellent sealing performance without using a conventional rubber seal ring but has the problem that, when the coupling is repeatedly disassembled and reassembled, the tapered portions are likely to be damaged, and leakage is likely to occur.

Further, in such a pipe coupling, a recess is formed between a tapered surface provided on an end portion of one of the pipe elements, such as pipes and a metal packing, and a surface of an end portion of another pipe element pressed against the tapered surface. That is, when the pipe elements are connected together and a fluid passage is defined by the inner peripheral wall surfaces of the pipe elements, an annular groove (recess) is formed in the peripheral wall surface of the fluid passage at the pipe element joint part. In this regard, in a piping system for a fluid food, a fluid medicine, or the like where hygiene control is important, for example, the groove formed in the peripheral wall surface of the fluid passage as stated above is problematic because the food, medicine, or the like passed through the fluid passage enters the groove. Therefore, it is generally necessary to disassemble and wash the pipe coupling each time a production run is completed. However, a complicated operation is required to disassemble, wash and reassemble the pipe coupling for each production run, causing an increase in production cost.

Patent Literature 1: WO2004/10917

SUMMARY OF THE INVENTION

In view of the above-described circumstances, it is an object of the present invention to provide a pipe coupling structure using no rubber seal ring and yet capable of being repeatedly disassembled and reassembled, and further, it is another object of the present invention to provide a pipe coupling structure which need not be frequently disassembled, washed and reassembled.

According to the present invention, there is provided a pipe coupling structure including a first pipe element having a first inner peripheral surface defining a first hole extending in an axial direction and a second pipe element having a second inner peripheral surface defining a second hole of the same diameter as the first hole. The first pipe element has one end portion in the axial direction. The one end portion has an annular first end edge of the first inner peripheral surface, an annular first sealing surface extending from the first end edge radially outward of the first pipe element and toward the other end portion of the first pipe element, and an annular first sealing portion with an acute angle defined by the first sealing surface and the first inner peripheral surface. The second pipe element has one end portion in an axial direction thereof. The one end portion has a second end edge to be abutted against the first end edge of the first pipe element such that the second hole is aligned with the first hole of the first pipe element. The one end portion of the second pipe element further has an annular second sealing surface extending radially outward from the second end edge, and an annular second sealing portion defined by the second sealing surface and the second inner peripheral surface. The first pipe element and the second pipe element are connected to each other in a state where the first pipe element and the second pipe element are abutted against each other at the first end edge and the second end edge with the first end edge and the second end edge pressed against each other.

In this pipe coupling structure, since the first pipe element and the second pipe element are as noted above connected to each other in a state where the first pipe element and the second pipe element are abutted against each other at the first end edge and the second end edge with the first end edge and the second end edge pressed against each other, there will be substantially no gap between the first inner peripheral surface of the first pipe element and the second inner peripheral surface of the second pipe element, and the first sealing portion and the second sealing portion are abutted against each other in a state where stress is concentrated on the first end edge and the second end edge. Accordingly, it will be possible to effect reliable sealing engagement between the first and second sealing portions with a relatively small force.

In the pipe coupling structure, the included angle formed by the second sealing surface and the second inner peripheral surface at the second sealing portion may be 90 degrees or more.

The pipe coupling structure may be arranged as follows. The first pipe element has a first outer peripheral surface and an annular first opposing surface extending from the first sealing surface to the first outer peripheral surface, and the second pipe element has a second outer peripheral surface and an annular second opposing surface extending from the second sealing surface to the second outer peripheral surface. The first opposing surface and the second opposing surface are configured such that, when the first end edge and the second end edge are abutted against each other with no pressing force applied thereto, the first opposing surface and the second opposing surface oppose each other across a gap therebetween, whereas, when the first end edge and the second end edge are abutted and pressed against each other with a pressing force not less than a predetermined level, the first opposing surface and the second opposing surface engage each other at least partially to prevent the first pipe element and the second pipe element from approaching each other.

With the above-described structure, the relative displacement of the first pipe element and the second pipe element is limited by the engagement between the first and second engagement portions, thereby limiting the deformation of the first and second sealing portions, and thus substantially preventing plastic deformation of the first and second sealing portions.

Specifically, it is preferable that the included angle between the first inner peripheral surface and the first sealing surface at the first sealing portion be in a range of 30 degrees to 50 degrees, and that an included angle between the second inner peripheral surface and the second sealing surface of the second pipe element be in a range of 125 degrees to 145 degrees.

The first pipe element and the second pipe element may be an elongated pipe, respectively.

In this case, the one end portion of the first pipe element and the end portion of the second pipe element may have a flange, respectively, extending radially outward. The reason for having the flanges is to establish the above-described sealing engagement by pulling the flanges toward each other with nuts and bolts or with a clamp as in the case of the conventional flange coupling.

Further, in this case, the arrangement may be as follows. The first pipe element has a first annular engagement surface at a position radially outside the first sealing surface. The first annular engagement surface is concentric with respect to the first inner peripheral surface and extends in the axial direction toward the second pipe abutted against the first pipe. The second pipe element has a second annular engagement surface at a position radially outside the second sealing surface. The second annular engagement surface is concentric with respect to the second inner peripheral surface and extends in the axial direction toward the first pipe when the second pipe and the first pipe are abutted against each other such that the second annular engagement surface is radially adjacent to the first annular engagement surface.

The reason for the above-described structure is as follows. When a force acts on the first and second pipe elements such that the first and second pipe elements are caused to be displaced in a direction perpendicular to the mutual axis of the pipe elements, the first and second annular engagement surfaces engage each other to prevent displacement of the two pipe elements. Even when such a force is applied to the first and second pipe elements in an earthquake or the like, the above-described structure can effectively prevent disconnection of the first and second pipes.

In another example, the arrangement may be as follows. Two elongated pipes are prepared as the first pipe elements, and one seal ring is prepared as the second pipe element, which is to be sandwiched between the elongated pipes. With the seal ring and the two elongated pipes axially aligned with each other, flanges provided on end portions of the two elongated pipes that are adjacent to the seal ring are urged toward each other, thereby connecting together the elongated pipes and the seal ring.

In this case, the seal ring may be of an elongated circular cylindrical shape, and end surfaces of the seal ring that constitute the second sealing surfaces may be in planes perpendicular to the axis of the circular cylindrical shape.

Further, the arrangement may be as follows. The end portions of the elongated pipes that have the flanges have annular recesses, respectively, each having an annular peripheral surface axially extending from an end surface of the end portion. The annular peripheral surface is larger in diameter than the first inner peripheral surface and concentric with respect to the first inner peripheral surface. The annular recesses each further have an annular surface extending from an inner end edge of the annular peripheral surface to the first inner peripheral surface to constitute the first sealing surface. The seal ring is accommodated in the mutually opposed annular recesses in coaxial relation to the annular recesses.

Further, in this case, the annular peripheral surface may be gradually tapered from the end surface toward the inner end edge.

Further, the seal ring may have an outer peripheral surface and an inner peripheral surface which are the same in diameter as the elongated pipes.

Further, the annular peripheral surface may be configured such that, when the seal ring is accommodated in the opposed annular recesses and an inner peripheral edge of each end surface of the seal ring that constitutes the second end edge is brought into contact with an end edge of an associated one of the elongated pipes that constitutes the first end edge, an outer peripheral edge of the end surface of the seal ring is substantially in contact with the annular peripheral surface.

In another example, the arrangement may be as follows. Two elongated pipes are prepared as the second pipe elements, and one seal ring is prepared as the first pipe element, which is to be sandwiched between the elongated pipes. With the seal ring and the two elongated pipes axially aligned with each other, flanges provided on end portions of the two elongated pipes that are adjacent to the seal ring are urged toward each other, thereby connecting together the elongated pipes and the seal ring.

In still another example, the arrangement may be as follows. The first pipe element and the second pipe element comprise an elongated pipe, respectively. One of the two elongated pipes is provided at one end thereof with an annular projecting portion axially extending from the one end in coaxial relation to the one elongated pipe, the annular projecting portion having a same inner diameter as the elongated pipes. The other of the two elongated pipes being provided at one end thereof with an annular recess coaxial with the other elongated pipe. The annular recess is configured to receive the annular projecting portion. The two elongated pipes being connected together by inserting the annular projecting portion into the annular recess so that an end edge of an inner peripheral surface of the annular projecting portion abuts against an end edge of an inner peripheral surface of the other elongated pipe, wherein one of the end edges of the inner peripheral surfaces is defined as the first end edge, and the other of the end edges is defined as the second end edge.

Embodiments of the present invention will be explained below on the basis of the accompanying drawings.

DETAILED DESCRIPTION OF THE PREFERRED EMBODIMENTS

Figure 1:
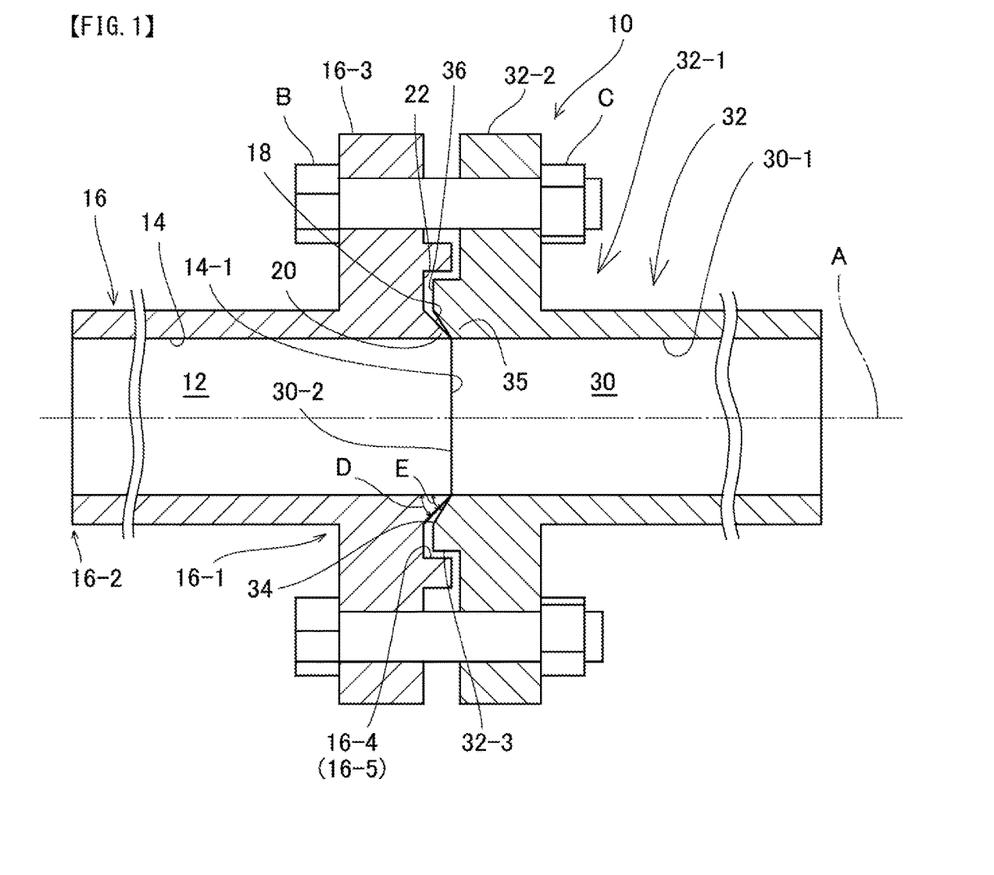
FIG. 1 is a sectional view of a pipe coupling structure according to one embodiment of the present invention.

First, a pipe coupling structure according to one embodiment of the present invention will be explained on the basis of FIG. 1.

As shown in the figure, a pipe coupling structure 10 includes a first pipe element (an elongated pipe in the illustrated example) 16 having a first inner peripheral surface 14 defining a through-hole (a first hole in the claims) 12 extending in the direction of an axis A. One end portion 16-1 of the first pipe element 16 has a conical first sealing surface 18 that extends from an end edge (first end edge) 14-1 of the first inner peripheral surface 14 radially outward of the first pipe element 16 and toward an other end portion 16-2 of the first pipe element 16. The first pipe element 16 has an annular first sealing portion 20 defined by the first sealing surface 18 and the first inner peripheral surface 14. The pipe coupling structure 10 further includes a second pipe element (an elongated pipe in the illustrated example) 32 having a second inner peripheral surface 30-1 defining a through-hole 30 of the same diameter as the through-hole 12. The second pipe element 32 is abutted against the one end portion 16-1 of the first pipe element 16 such that the through-hole 30 is aligned with the through-hole 14 of the first pipe element 16. The second pipe element 32 has a second sealing surface 34 extending radially outside the first sealing surface 18 toward the first pipe element 16 from an end edge (second end edge) 30-2 of the second inner peripheral surface 30-1 which butt against the end edge 14-1 of the first inner peripheral surface 14 when the second pipe element 32 is abutted against the one end portion 16-1 of the first pipe element 16. The second pipe element 32 has a second sealing portion 35 defined by the second sealing surface 34 and the second inner peripheral surface 30-1. When the first pipe element 16 and the second pipe element 32 are pressed against each other in the direction of the axis A and thus only slightly displaced toward each other, the first and second sealing portions 20 and 35 are pressed against each other and sealingly engaged with each other while being elastically deformed (particularly the first sealing portion 20) by stress concentration centered at the first end edge 14-1 and the second end edge 30-2.

The first pipe element 16 and the second pipe element 32 respectively have a first opposing surface 22 and a second opposing surface 36 which extend from the first sealing surface 18 and the second sealing surface 20 to the outer peripheral surfaces of flanges 16-3 and 32-2 (explained below), respectively. When the first pipe element 16 and the second pipe element 32 are pressed against each other in the direction of the axis A and thus only slightly displaced toward each other, the first and second opposing surfaces 22 and 36 engage each other at least partially to prevent further displacement of the first and second pipe elements 16 and 32.

In the illustrated embodiment, the end portion 16-1 of the first pipe element 16 and the end portion 32-1 of the second pipe element 32 have flanges 16-3 and 32-2, respectively, which extend radially outward. A plurality of bolts B are inserted through the flanges 16-3 and 32-2 and threadedly engaged with nuts C to pull and fasten the flanges 16-3 and 32-2 together.

Further, the first opposing surface 22 of the first pipe element 16 is provided with an annular projection 16-5 projecting toward the second opposing surface 36 of the second pipe element 32 and having a first annular engagement surface 16-4 concentric with respect to the first inner peripheral surface 14. The second opposing surface 36 of the second pipe element 32 is provided with a second annular engagement surface 32-3 concentric with respect to the second inner peripheral surface 30-1 and extending to be radially inwardly adjacent to the first annular engagement surface 16-4. When the first pipe element 16 and the second pipe element 32 are caused by an earthquake or the like to be displaced relative to each other in a direction traverse to the mutual axis A of the first and second pipe elements 16 and 32, the first and second annular engagement surfaces 16-4 and 32-3 engage each other to prevent the displacement of the first and second pipe elements 16 and 32.

When a high fluid pressure is applied to a fluid passage comprising the through-holes 12 and 30 in a state where the second pipe element 32 and the first pipe element 16 are pressed against each other, the first sealing portion 20 of the first pipe element 16 is pressed toward the second sealing surface 34 and elastically deformed by the fluid pressure, thereby making it possible to enhance the sealing engagement between the first sealing surface 18 and the second sealing surface 34.

Specifically, the arrangement is such that the included angle D between the first inner peripheral surface 14 and the first sealing surface 18, which define the first sealing portion 20 of the first pipe element 16, is in the range of about 30° to about 50°, and that the included angle E formed by the second sealing surface 34 with the first inner peripheral surface 14 when the second pipe element 32 is axially aligned with and abutted against the first pipe element 16 is in the range of about 35° to about 55° (the included angle between the second inner peripheral surface 30-1 and the second sealing surface 34 is in the range of 125° to 145°). Preferably, the arrangement is such that the included angle D between the first inner peripheral surface 14 and the first sealing surface 18 at the first sealing portion 20 is 40°, and that the included angle E between the first inner peripheral surface 14 and the second sealing surface 34 when the second pipe element 32 is aligned with and abutted against the first pipe element 16 is about 45°, so that the difference between the included angles of the first and second sealing surfaces 18 and 34 is of the order of about 5°. In other words, the included angle D between the first inner peripheral surface 14 and the first sealing surface 18 is an acute angle, and the included angle between the second inner peripheral surface 30-1 and the second sealing surface 34 is an obtuse angle.

Figure 2:
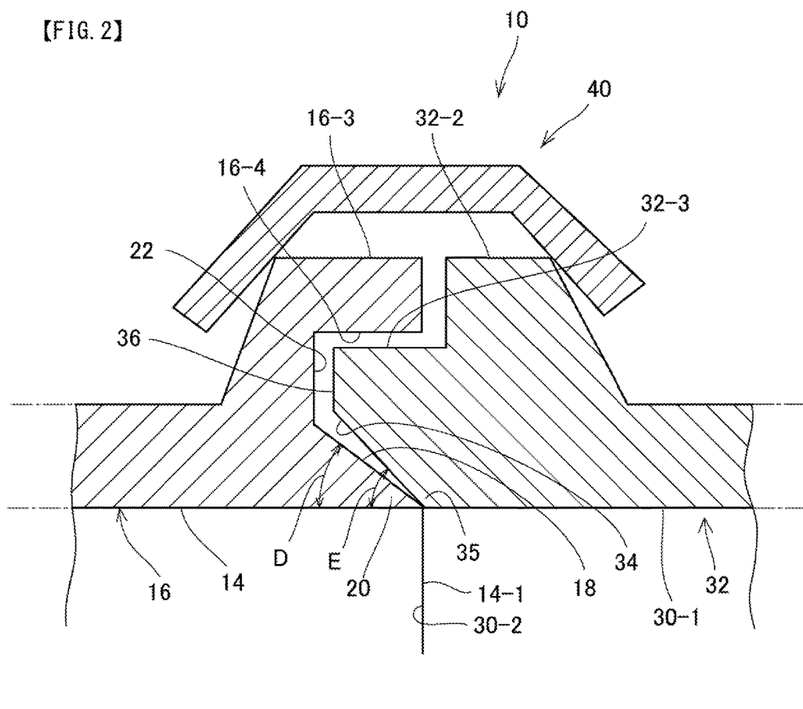
FIG. 2 is a sectional view of a main part of a pipe coupling structure according to a second embodiment of the present invention.

FIG. 2 shows an upper half of a pipe coupling structure 10 according to a second embodiment. This pipe coupling structure is the same in basic structural arrangement as that shown in FIG. 1; therefore, constituent elements of the second embodiment which are technically practically the same as those of the embodiment shown in FIG. 1 are denoted by the same names and reference numerals as those of the above-described embodiment. In the pipe coupling structure of the second embodiment, flanges 16-3 and 32-2 have inclined outer peripheral surfaces and are fastened together, not by using bolt-nut fastening, but by an annular fastening member 40 comprising a pair of semicircular members pivotally connected at one end thereof, which is generally referred to as "ferrule joint" or the like. That is, by tightening the fastening member 40, the flanges 16-3 and 32-2 are pulled toward each other and connected together.

Figure 3:
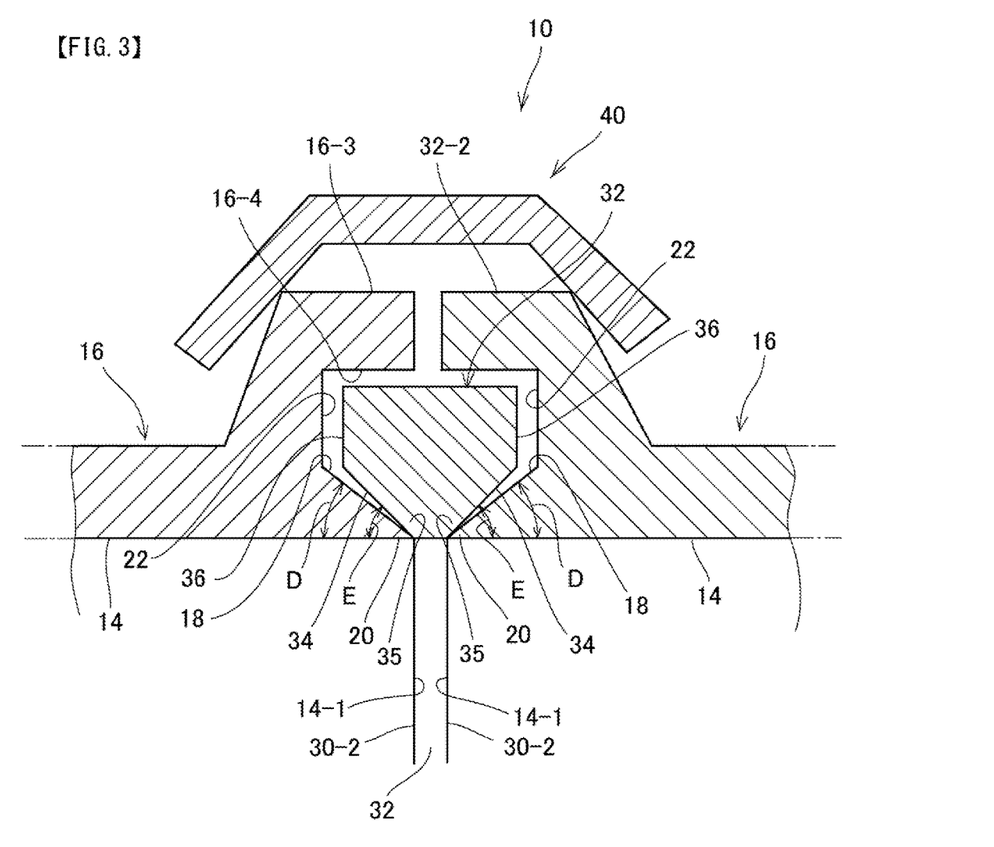
FIG. 3 is a sectional view of a main part of a pipe coupling structure according to a third embodiment of the present invention.

FIG. 3 shows an upper half of a pipe coupling structure 10 according to a third embodiment. In the third embodiment, constituent elements which are technically practically the same as those of the first embodiment are denoted by the same names and reference numerals as those of the first embodiment. In the pipe coupling structure of the third embodiment, two elongated pipes are prepared as first pipe elements 16 (only end portions of the elongated pipes are shown in the figure), and a seal ring as a second pipe element 32 is sandwiched between the first pipe elements 16. As illustrated in the figure, the seal ring as the second pipe element 32 in this embodiment has at each axial end thereof a second sealing portion 35 with an obtuse angle defined by the inner peripheral surface 32 and the second sealing surface 34. Each second sealing portion 35 butts against the first sealing portion 20 of the associated first pipe element through a first end edge 14-1 and a second end edge 32-2.

Figure 4:
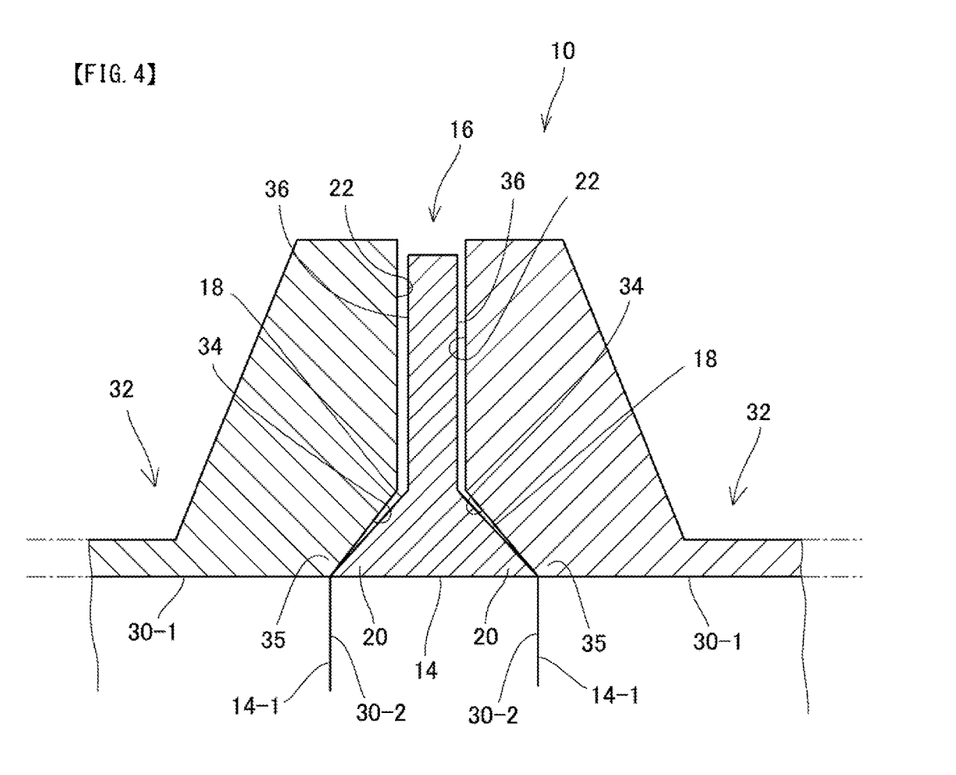
FIG. 4 is a sectional view of a main part of a pipe coupling structure according to a fourth embodiment of the present invention.

FIG. 4 shows an upper half of a pipe coupling structure 10 according to a fourth embodiment. In the pipe coupling structure of the fourth embodiment, two elongated pipes are prepared as second pipe elements 32 (only end portions of the elongated pipes are shown in the figure), and a seal ring as a first pipe element 16 is sandwiched between the second pipe elements 32. In the fourth embodiment, constituent elements which are technically the same as those of the above-described first embodiment are denoted by the same reference numerals as those of the first embodiment. As illustrated in the figure, the first pipe element 16 has at each axial end thereof a first sealing portion 20 with an acute angle defined by a first sealing surface 18 extending from an end edge 14-1 of an inner peripheral surface 14 and the first inner peripheral surface 14. Each first sealing portion 20 butts against a second sealing portion 35 of the associated second pipe element 32 through a first end edge 14-1 and a second end edge 32-2.

Figure 5:
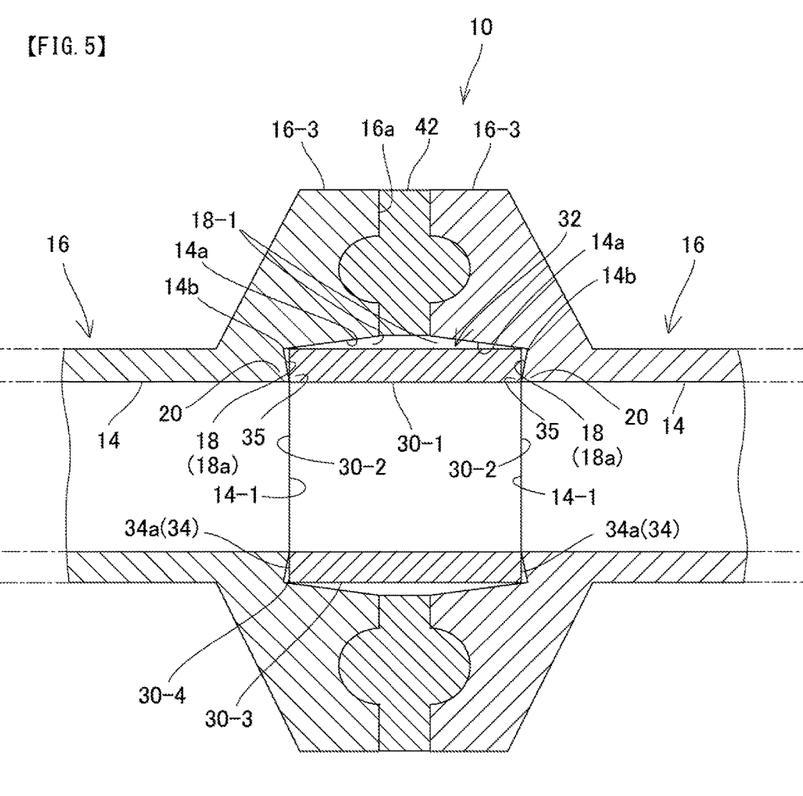
FIG. 5 is a sectional view of a main part of a pipe coupling structure according to a fifth embodiment of the present invention.

A pipe coupling structure 10 according to a fifth embodiment shown in FIG. 5 has two first pipe elements 16 which are elongated pipes (only end portions of the elongated pipes are shown in the figure) and a second pipe element 32 comprising a circular cylindrical seal ring sandwiched between the first pipe elements 16. In the fifth embodiment, constituent elements which are technically the same as those of the first embodiment are denoted by the same names and reference numerals as those of the first embodiment. The second pipe element 32 has the same inner and outer diameters as those of the elongated pipes as the first pipe elements 16. Both end surfaces 34a are disposed in planes perpendicular to the axis of the second pipe element 32. In the second pipe element 32, the end surfaces 34a constitute second sealing surfaces 34, respectively, and each second sealing surface 34 forms a second sealing portion 35 of 90° between itself and a second inner peripheral surface 30-1. An end portion of each first pipe element 16 that has a flange 16-3 has an annular recess 18-1 having an annular peripheral surface 14a axially extending from an end surface 16a of the end portion. The annular peripheral surface 14a is larger in diameter than the first inner peripheral surface 14 and concentric with respect to the first inner peripheral surface 14. The annular recess 18-1 further has an annular surface 18a extending from an inner end edge 14b of the annular peripheral surface 14a to the first inner peripheral surface 14 to constitute a first sealing surface 18. The second pipe element 32 is accommodated in the mutually aligned and opposed annular recesses 18-1 in coaxial relation to the annular recesses 18-1. Each annular peripheral surface 14a is gradually tapered from the end surface 16a toward the inner end edge 14b and the first inner peripheral surface 14 and the first sealing surface 18 define a first sealing portion 20 with an acute angle. The first sealing portion 20 butts against the associated second sealing portion 35 of the second pipe element 32 at the first end edge 14-1 and the second end edge 30-2. To set the second pipe element 32 between the first pipe elements 16, the second pipe element 32 is first inserted into the annular recess 18-1 of one first pipe element 16 (e.g. the left first pipe element 16 as seen in FIG. 5) from one end (left end) thereof so that the left second end edge 30-2 abuts against the first end edge 14-1 of the left first pipe element 16. At this time, the tapered annular peripheral surface 14a functions as a guide for the second pipe element 32, so that, when the second end edge 30-2 is in abutting contact with the first end edge 14-1, a left end edge 30-4 (as seen in the figure) of an outer peripheral surface 30-3 of the second pipe element is substantially in contact with the annular peripheral surface 14a. In the illustrated example, after a rubber annular packing 42 has been attached to the end surface 16a of the left first pipe element 16, the other (right) first pipe element 16 is abutted at the end surface 16a thereof against the annular packing 42 so that a part of the second pipe element 32 that projects rightward from the left first pipe element 16 is accommodated in the annular recess 18-1 of the right first pipe element 16, thereby bringing the first end edge 14-1 of the left first pipe element into abutting contact with the second end edge 30-2 of the second pipe element. The rubber packing 42 functions as a reserve seal member in case of leakage of the fluid from the fluid passage in the pipe coupling structure concerned and also functions as a member that prevents an external foreign matter from entering a gap between the first pipe elements. The first and second pipe elements combined as shown in FIG. 5 are connected and secured together by pulling the flanges 16-3 toward each other, which are provided on the respective end portions of the first pipe elements 16, using fastening devices such as bolts B and nuts C, which are shown in FIG. 1, or a ferrule joint 40 as shown in FIG. 2.

Figure 6:
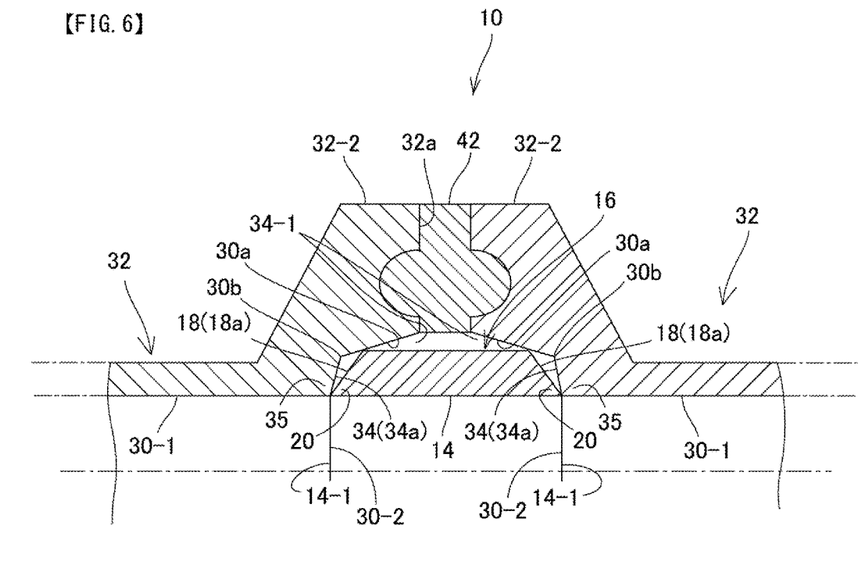
FIG. 6 is a sectional view of a main part of a pipe coupling structure according to a sixth embodiment of the present invention.

FIG. 6 shows an upper half of a pipe coupling structure 10 according to a sixth embodiment which is a modification of the fifth embodiment shown in FIG. 5. The pipe coupling structure 10 has two second pipe elements 32 which are elongated pipes (only end portions of the elongated pipes are shown in the figure) and a first pipe element 16 comprising a circular cylindrical seal ring sandwiched between the second pipe elements 32. In the sixth embodiment, constituent elements which are technically the same as those of the fifth embodiment are denoted by the same names and reference numerals as those of the fifth embodiment. The first pipe element 16 has the same inner and outer diameters as those of the elongated pipes as the second pipe elements 32. Both end surfaces 18a of the first pipe element 16 are inclined surfaces constituting first sealing surfaces 18. Each first sealing surface 18 forms a first sealing portion 20 with an acute angle between itself and a first inner peripheral surface 14. An end portion of each second pipe element 32 that has a flange 32-2 has an annular recess 34-1 having an annular peripheral surface 30*a* axially extending from an end surface 32*a* of the end portion. The annular peripheral surface 30*a* is larger in diameter than the second inner peripheral surface 30-1 and concentric with respect to the second inner peripheral surface 30-1. The annular recess 34-1 further has an annular surface 34*a* extending from an inner end edge 30*b* of the annular peripheral surface 30*a* to the second inner peripheral surface 30-1 to constitute a second sealing surface 34. The first pipe element 14 is accommodated in the mutually aligned and opposed annular recesses 34-1 in coaxial relation to the annular recesses 34-1. Each annular peripheral surface 30*a* is gradually tapered from the end surface 32*a* toward the inner end edge 30*b* and the second inner peripheral surface 30-1 and the second sealing surface 34 define a second sealing portion 35 with an obtuse angle of not less than 90°. Each second sealing portion 35 and the associated first sealing portion 20 of the first pipe element 16 are abutted against each other at a first end edge 14-1 and a second end edge 30-2. The second pipe element 32 is set between the second pipe elements 32 in the same way as the first pipe element 16 in the fifth embodiment. In this case, the annular peripheral surfaces 30*a* have a guide function similar to the above-described guide function of the annular peripheral surfaces 14*a* in the fifth embodiment.

Figure 7:
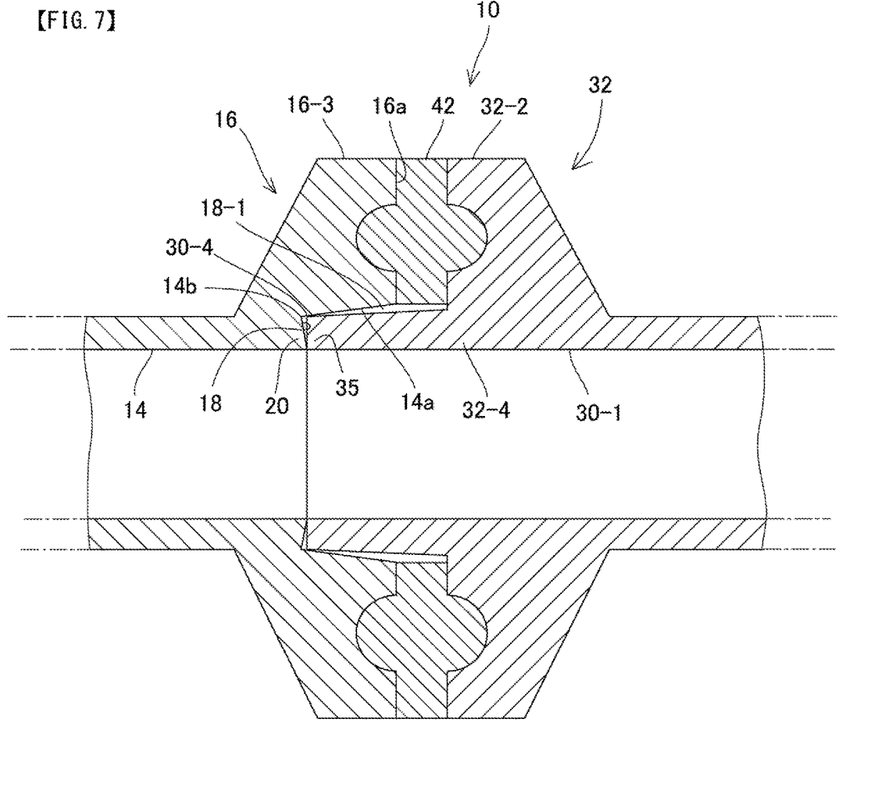
FIG. 7 is a sectional view of a main part of a pipe coupling structure according to a seventh embodiment of the present invention.

FIG. 7 shows a pipe coupling structure 10 according to a seventh embodiment which is a modification of the sixth embodiment shown in FIG. 6. In this embodiment, constituent elements which are technically the same as those of the fifth embodiment are denoted by the same names and reference numerals as those of the fifth embodiment. In the pipe coupling structure 10, a first pipe element 16 and a second pipe element 32 are elongated pipes (only end portions of the elongated pipes are shown in the figure). The first pipe element 16 is formed with an annular recess 18-1 similar to that in the fifth embodiment, and the second pipe element 32 has a circular cylindrical projecting portion 32-4 extending from a flange 32-2 thereof. The projecting portion 32-4 is configured to be inserted into the annular recess 18-1. The size and functional relationships between the annular recess 18-1 and the annular projecting portion 32-4 are the same as the relationships between the annular recess 18-1 of the left first pipe element 16 and the second pipe element 32 in the fifth embodiment; therefore, a detailed explanation thereof is omitted.

The above-described pipe coupling structures according to the embodiments of the present invention can be used in piping systems handling high-pressure fluids by making the pipe coupling structures of a metal, e.g. a stainless steel. The pipe coupling structures, however, need not always be made of a metal but may be made of a rigid resin material or the like.

The invention claimed is:

1. A pipe coupling structure comprising:
a pair of pipe elements each having a hole of a circular cross-section to define an inner peripheral surface of the pipe element, the pipe elements being axially aligned and connected with one another, the pipe elements including:
end portions with annular flanges, the end portions defining end surfaces which oppose one another across a gap when the pipe elements are connected with one another, and
circular recesses formed in the end surfaces coaxially with the holes, the circular recesses being defined by circular peripheral surfaces axially extending from the end surfaces in such a manner that diameters of the circular peripheral surfaces gradually reduce as they go axially from the end surfaces, and circular end surfaces radially inwardly extending from axially inner end edges of the circular peripheral surfaces and reaching the inner peripheral surfaces of the holes to define circular end edges between the circular end surfaces and the inner peripheral surfaces of the pipe elements; and
a seal ring in a shape of a circular cylinder, the seal ring comprising opposite end surfaces and inner and outer peripheral surfaces which extend between the opposite end surfaces and respectively having uniform diameters along axial lengths thereof, the inner peripheral surface of the seal ring being equal to the holes of the pipe elements in diameter, the seal ring being disposed between the pipe elements when the pipe elements are connected with one another while opposite ends of the seal ring are inserted into corresponding ones of the circular recesses of the pipe elements so that opposite end edges of the inner peripheral surface of the seal ring respectively sealingly engage corresponding ones of the circular end edges of the pipe elements and opposite end edges of the outer peripheral surface of the seal ring respectively substantially engage corresponding ones of the circular peripheral surfaces of the circular recesses, the opposite end surfaces of the seal ring being respectively configured not to engage corresponding ones of the circular end surfaces of the circular recesses when the opposite end edges of the inner peripheral surface of the seal ring engage the corresponding circular end edges of the pipe elements,
wherein the seal ring has an outer peripheral surface and an inner peripheral surface which are same in diameter as an outer peripheral surface and an inner peripheral surface, respectively, of the pipe elements.

2. A pipe coupling structure comprising:
a pair of pipe elements each having a hole of a circular cross-section to define an inner peripheral surface of the pipe element, the pipe elements being axially aligned and connected with one another, the pipe elements including:
end portions with annular flanges, the end portions defining end surfaces which oppose one another across a gap when the pipe elements are connected with one another, and
circular recesses formed in the end surfaces coaxially with the holes, the circular recesses being defined by circular peripheral surfaces axially extending from the end surfaces in such a manner that diameters of the circular peripheral surfaces gradually reduce as they go axially from the end surfaces, and circular end surfaces radially inwardly extending from axially inner end edges of the circular peripheral surfaces and reaching the inner peripheral surfaces of the holes to define circular end edges between the circular end surfaces and the inner peripheral surfaces of the pipe elements; and
a seal ring in a shape of a circular cylinder, the seal ring comprising opposite end surfaces and inner and outer peripheral surfaces which extend between the opposite end surfaces and respectively having uniform diameters along axial lengths thereof, the inner peripheral surface of the seal ring being equal to the holes of the pipe elements in diameter, the seal ring being disposed between the pipe elements when the pipe elements are connected with one another while opposite ends of the seal ring are inserted into corresponding ones of the circular recesses of the pipe elements so that opposite end edges of the inner peripheral surface of the seal ring respectively sealingly engage corresponding ones of the circular end edges of the pipe elements and opposite end edges of the outer peripheral surface of the seal ring respectively substantially engage corresponding ones of the circular peripheral surfaces of the circular recesses, the opposite end surfaces of the seal ring being respectively configured not to engage corresponding ones of the circular end surfaces of the circular recesses when the opposite end edges of the inner peripheral surface of the seal ring engage the corresponding circular end edges of the pipe elements, wherein the end surfaces of the seal ring are each in respective planes perpendicular to an axis of the seal ring, and the seal ring has an outer peripheral surface and an inner peripheral surface which are same in diameter as an outer peripheral surface and an inner peripheral surface, respectively, of the pipe elements.

3. A pipe coupling structure comprising:
a pair of pipe elements each having a hole of a circular cross-section to define an inner peripheral surface of the pipe element, the pipe elements being axially aligned and connected with one another, the pipe elements including:
  end portions with annular flanges, the end portions defining end surfaces which oppose one another across a gap when the pipe elements are connected with one another, and
  circular recesses formed in the end surfaces coaxially with the holes, the circular recesses being defined by circular peripheral surfaces axially extending from the end surfaces in such a manner that diameters of the circular peripheral surfaces gradually reduce as they go axially from the end surfaces, and circular end surfaces radially inwardly extending from axially inner end edges of the circular peripheral surfaces and reaching the inner peripheral surfaces of the holes to define circular end edges between the circular end surfaces and the inner peripheral surfaces of the pipe elements;
a seal ring in a shape of a circular cylinder, the seal ring comprising opposite end surfaces and inner and outer peripheral surfaces which extend between the opposite end surfaces and respectively having uniform diameters along axial lengths thereof, the inner peripheral surface of the seal ring being equal to the holes of the pipe elements in diameter, the seal ring being disposed between the pipe elements when the pipe elements are connected with one another while opposite ends of the seal ring are inserted into corresponding ones of the circular recesses of the pipe elements so that opposite end edges of the inner peripheral surface of the seal ring respectively sealingly engage corresponding ones of the circular end edges of the pipe elements and opposite end edges of the outer peripheral surface of the seal ring respectively substantially engage corresponding ones of the circular peripheral surfaces of the circular recesses, the opposite end surfaces of the seal ring being respectively configured not to engage corresponding ones of the circular end surfaces of the circular recesses when the opposite end edges of the inner peripheral surface of the seal ring engage the corresponding circular end edges of the pipe elements; and
a circular packing made from resilient material disposed between the end surfaces when the pipe elements are connected with one another.

* * * * *